United States Patent
Erman et al.

(10) Patent No.: US 8,406,233 B2
(45) Date of Patent: Mar. 26, 2013

(54) PREDICTIVE SYNCHRONIZATION FOR CLUSTERED DEVICES

(75) Inventors: Amir Erman, Rosh-Hayain (IL); Amnon Perlmutter, Givatayim (IL); Ben Zion Weissman, Ramat-Gan (IL)

(73) Assignee: Check Point Software Technologies Ltd., Tel Aviv (IL)

( * ) Notice: Subject to any disclaimer, the term of this patent is extended or adjusted under 35 U.S.C. 154(b) by 234 days.

(21) Appl. No.: 12/876,259

(22) Filed: Sep. 7, 2010

(65) Prior Publication Data

US 2012/0057591 A1     Mar. 8, 2012

(51) Int. Cl.
*H04L 12/28* (2006.01)
*H04L 12/56* (2006.01)
*G06F 15/173* (2006.01)

(52) U.S. Cl. .................. 370/392; 709/243

(58) Field of Classification Search ........... 370/351, 370/389, 392; 709/238, 243
See application file for complete search history.

(56) References Cited

U.S. PATENT DOCUMENTS

| | | | |
|---|---|---|---|
| 6,731,648 B1 * | 5/2004 | Cotter | 370/458 |
| 6,958,977 B1 * | 10/2005 | Mitrani et al. | 370/252 |
| 7,107,609 B2 | 9/2006 | Cheng et al. | |
| 7,254,138 B2 * | 8/2007 | Sandstrom | 370/412 |
| 7,391,731 B1 * | 6/2008 | Skelly et al. | 370/238 |
| 7,401,355 B2 | 7/2008 | Supnik et al. | |
| 7,613,822 B2 | 11/2009 | Joy et al. | |
| 8,018,953 B1 * | 9/2011 | Zhao | 370/400 |
| 2002/0089982 A1 * | 7/2002 | Novaes | 370/390 |
| 2005/0080923 A1 * | 4/2005 | Elzur | 709/238 |
| 2006/0047841 A1 * | 3/2006 | Brown et al. | 709/230 |
| 2008/0002599 A1 * | 1/2008 | Yau et al. | 370/310 |
| 2009/0002151 A1 * | 1/2009 | Ferri et al. | 340/539.1 |
| 2009/0009799 A1 * | 1/2009 | Sato | 358/1.15 |
| 2010/0040066 A1 * | 2/2010 | Hao et al. | 370/395.31 |
| 2010/0278102 A1 * | 11/2010 | Lee et al. | 370/328 |

* cited by examiner

*Primary Examiner* — Ronald Abelson (74) *Attorney, Agent, or Firm* — Mark M. Friedman (57) ABSTRACT

A method and system is provided for a scalable clustered system. The method and system may handle asynchronous traffic as well as session backup. In the method and system, a home cluster member having ownership of a local session predicts designation of a an other cluster member to receive a packet associated with the local session and sends appropriate state information or forwarding instruction to the other network member.

19 Claims, 5 Drawing Sheets

PREDICTIVE SYNCHRONIZATION FOR CLUSTERED DEVICES

FIELD AND BACKGROUND OF THE INVENTION

Various methods and systems for synchronization of a cluster of devices (sometimes referred to as a cluster network or cluster system) and in particular for predictive synchronization of a cluster of multiple interconnected firewall devices are possible.

If a process is performed on a data packet and the process requires more time than the latency between packets in a data stream, then a bottleneck may occur, backing up data traffic and slowing data communication. One solution to such a bottleneck is to perform the function using a cluster of multiple devices sometimes referred to as a clustered network. In the cluster, a plurality of member devices simultaneously performs a process on a plurality of packets. As a packet arrives, a distributor directs the packet to an individual member device for processing (a single system may include multiple distributors). In sum, using parallel processing, the cluster of devices processes a large number of packets without slowing the data stream.

Firewall devices are often deployed in a clustered system. A firewall device inspects communication flows entering or leaving a trusted network and filters out unauthorized packets of data. For example, one popular firewall policy allows "solicited" Transmission Control Protocol (TCP) connections initiated from the protected network, but denies TCP "unsolicited" connections initiated from outside (e.g. the Internet). Another popular protocol is User Datagram Protocol (UDP) that allows data to enter the protected network when solicited by a "SYN" packet. Both UDP and. TCP are stateful protocols in which determining whether a data packet is a legitimate reply to a request from a member of the trusted network depends on state information. State information about a session or connection may be established in a firewall device when the first data packet sent from the trusted network initiating the connection is processed. Often state information used to identify a legitimate packet is associated with the packet header [for example all or part of the full TCP state, including source and destination addresses, Internet protocol (IP) addresses, ports and sequence numbers]. Different firewall implementations may have different header information.

When all communication is handled by a single firewall device, state information derived from the request packet may be stored locally to the firewall device for the lifetime of the session.

Often a single device cannot keep up with all the communication causing a communication bottleneck. One solution is to use a cluster of multiple firewall devices. Each device handles a portion of the communication traffic. In the firewall cluster, it is possible that a request packet may be handled by a first member firewall device and an associated response packet may be handled by a second member device. In order for the second member device to handle the response packet it must have access to state information stored in the first member firewall device, which handled the request packet. Thus, some firewall clusters share state information globally, for example by multicast broadcasting of state information to many or all of the member firewall devices. Global state information-sharing is complicated and does not scale well when the number of firewall devices in a cluster rises. Because many network connections are "short-lived," processing power of firewall devices is wasted synchronizing state information.

A solution is to have a distributor that sends all packets of an established connection to the "home" firewall device in which the state information is kept locally. A conventional distributor sends a packet member to a cluster member designated by a deterministic hash function of the IP header information. This methodology allows a simple stateless distributor to consistently send packets of a single session having similar IP headers to a single cluster member. If all packets of each session are always sent to the same member firewall device, then there may be no need to share state information.

There are situations (for example an asynchronous session as illustrated herein below) where a stateless distributor based on a simple hash function may fail to direct all packets of a session to the same cluster member. Thus, a conventional firewall cluster with a stateless distributor may require sharing of state information in order to handle asynchronous sessions.

Figure 1:
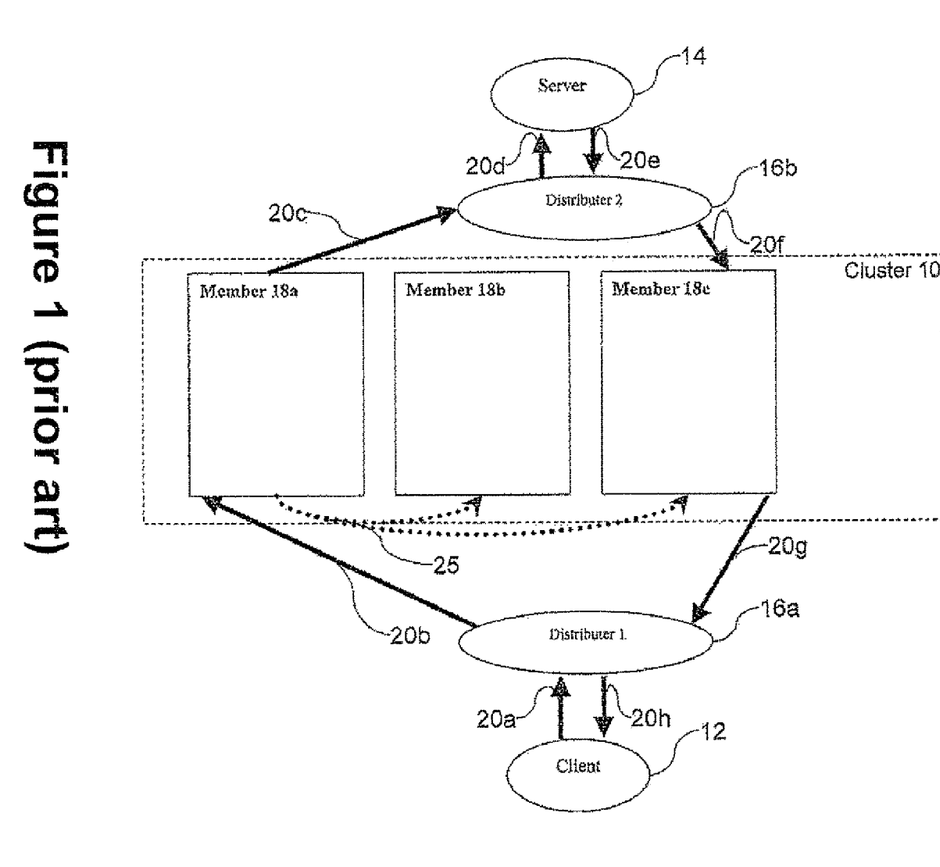
FIG. 1 is a block diagram illustrating a previous art cluster having a stateless distributor.

FIG. 1 illustrates an example of a cluster 10 of firewall devices handling an asynchronous session. A distributor 16a is employed to load-balance traffic from the trusted network and a distributor 16b is employed to load-balance traffic from the Internet.

Distributors 16a and 16b evenly distribute packets among three members 18a, 18b, and 18c of cluster 10 for security processing. For example, a request packet is sent 20a by a client 12 on a trusted network through distributer 16a. The packet is intended for a server 14 on the Internet.

Distributor 16a performs a deterministic hash of the relevant packet fields (e.g., the source address src-IP, and destination address dst-IP) to designate member 18a to receive the request packet and distributor 16a sends 20b the request packet to member 18a. Due to security considerations, member 18a changes the packet header (for example by performing NAT [network address translation] or VPN encryption. Thus, the packet fields are now changed to a translated source address and the original destination address (trans-IP, dst-IP). Member 18a sends 20c the amended request packet to distributor 16b and distributor 16b sends 20d the amended request packet to server 14.

Server 14 sends 20e a reply packet back to the translated source addresses of the modified header of the request packet (i.e., the reply packet has as the source and destination address, dst-IP and trans-IP respectively). The reply packet arrives to distributor 16b, and distributor 16b performs a hash using the same deterministic algorithm as distributor 16a. Because the IP addresses of the reply packet differ from the IP addresses of the original request packet, distributor 16b designates member 18c to receive the reply packet (and not member 18a, which received the original request packet) and sends 20f the reply packet to member 18c.

Thus, an asymmetric session has been created through firewall cluster 10 (the reply packet is handled by member 18c, which did not handle the request packet). Member 18c requires state information (for example member 18c needs to know the IP header information of the request packet) in order to determine validity of the reply packet.

In general, in order to synchronize asymmetric flows between members, it is necessary to provide the required information for security processing (TCP state, TCP sequencing) In the conservative synchronization approach, information on all sessions through member 18a is relayed 25 by a multicast broadcast to all other members 18b-c in order that every member 18a-c can handle the reply stream (it is necessary to send information to all members 18b-c because it is not known, a priori, to which member 18a-c the reply stream will be directed by distributor 16b). Based on information from the request packet, member 18c verifies and sends 20g the reply packet to distributor 16*a*, and distributor 16*a* sends 20*h* the reply packet to client 12.

As the cluster grows (having a large number of members to handle a large quantity of traffic quickly) communicating and duplicate storing of state information amongst a large number of cluster members will take up significant system resources. With increasing cluster size the increasing need for communication and data storage among members will significantly hurt performance scalability of the clustered system.

Various solutions have been proposed to solve the scalability problem of clustered systems handling asymmetric sessions. U.S. Pat. No. 7,107,609 to Cheng et al. teaches use of a multicast query to find the home member that owns a connection. The need for a query and reply every time a cluster member receives an unknown packet from the Internet may slow system performance and make the system prone to DoS attacks, where a large number of unknown packets overwhelm the system's ability to respond.

U.S. Pat. No. 7,401,355 to Supnik et al. teaches use of a single, stateful smart distributor for flow both from the Internet to the trusted network and from the trusted network to the Internet. Since the single distributor handles all flows, the distributor is aware of changes in IP address and always directs return traffic to the home cluster member that owns a session. As scale increases, the requirement of a single distributor that can statefully handle all flows may significantly increase the cost of the clustered system. Furthermore, the distributor may itself become a bottleneck, limiting system scalability and performance.

U.S. Pat. No. 7,613,822 to Joy, et al. describes a system where members of the cluster communicate with the distributor in order to send traffic to the home member of a session. The requirement of communication between the distributor and members makes necessary the use of a sophisticated custom distributor and the requirement that all cluster members communicate with the distributor may limit performance as the cluster scale increases.

Even in previous art clustered systems having a stateful distributor, which directs all packets of a particular session consistently to the same member, multiple copies of session state information are often sent to other members of the cluster in order to provide for backup. For example, if a home member of the cluster fails during a session, the distributor will send continuation of the session to a backup member. In previous art, the home member may not know which cluster member will be used as a backup for a given session. Therefore the home member may relay state information of the session to many other members so that each member is prepared to receive the session continuation in case of failure of the home member. The need for each member of a cluster to constantly update many other members of the cluster of the state of one or more sessions in order that each of the many members can serve as a backup member for any of the sessions results in major scaling problems.

There is thus a widely recognized need and it would be highly advantageous to have a cluster of stateful member devices that is scalable (can be enlarged without undue increase in communication between members) and that can handle backup and asymmetric sessions.

SUMMARY OF THE INVENTION

Various methods and systems for synchronization of clustered devices and in particular for synchronization of a unicast firewall cluster system are possible.

An embodiment of a method of synchronizing a clustered system having at least a first member and a second member may include the step of relaying from the first member to the second member information associated with a packet before arrival of the packet to the second member. The method may also include the step of predicting designation of the second member to receive the packet.

In an embodiment of a method of synchronizing a clustered system, the packet may be an asynchronous reply packet.

In an embodiment of a method of synchronizing a clustered system, the second member may be a backup member.

In an embodiment of a method of synchronizing a clustered system, the step of predicting may include computing a deterministic function.

In an embodiment of a method of synchronizing a clustered system, the step of predicting may include computing a hashing function.

An embodiment of a method of synchronizing a clustered system may also include the step of bouncing the packet from the second member to the first member.

In an embodiment of a method of synchronizing a clustered system, the step of relaying may be directed to the second member but not to a third member of the clustered system.

In an embodiment of a method of synchronizing a clustered system, the step of relaying may be by unicast communication.

In an embodiment of a method of synchronizing a clustered system, the step of relaying may be subsequent to the step of predicting.

An embodiment of a method of synchronizing a clustered system may also include the step of discarding of an illegitimate packet by the first member.

An embodiment of a computer-readable storage media having computer executable instructions stored on the media, may include computer-executable instructions that when executed configure a clustered system to perform actions including relaying of information associated with a data packet from a first member of the clustered system to a second member of the clustered system before arrival of the data packet to the second member. The instructions may also when executed configure the first member of the clustered system for predicting designation of the second member to receive the data packet.

In an embodiment of a computer-readable storage media, instructions for predicting designation of the second member may also includes instructions for computing a deterministic function.

In an embodiment of a computer-readable storage media, instructions for predicting designation of the second member may also includes instructions for computing a hashing function.

In an embodiment of a computer-readable storage media, the instructions when executed may configure the clustered system for further bouncing the data packet from the second member to the first member.

In an embodiment of a computer-readable storage media, instructions for relaying information and instructions to the second member may be so configured that the information or forwarding instructions are not relayed to a third member of the clustered system.

In an embodiment of a computer-readable storage media, instructions for relaying may be configured for unicast communication.

In an embodiment of a computer-readable storage media, the instructions when executed may configure the clustered system to perform relaying of information and forwarding instructions after predicting designation of the second member.

An embodiment of computer-readable storage media having computer executable instructions stored on the media, may include computer-executable instructions that when executed further configure the first member of the clustered system to discard an illegitimate packet.

An embodiment of a clustered system may including a plurality of members, and also include a memory accessible to a first member of the plurality of members. The memory may be configured to store a state machine and an algorithm for predicting designation of a second member of the plurality of members to receive a data packet. The clustered system may further include a processor accessible to the first member. The processor may be configured to execute the algorithm.

In an embodiment of a clustered system the processor may be further configured for relaying information associated with the data packet to the second member.

In an embodiment of a clustered system the information may include instructions for the second member to bounce the data packet to the first member.

In an embodiment of a clustered system the second member may be a backup member.

In an embodiment of a clustered system the processor may be further configured to not relay the information to a third member of the plurality of members.

In an embodiment of a clustered system the processor may be further configured to relay the information to the second member by unicast communication.

In an embodiment of a clustered system the processor may be further configured to discard an illegitimate packet.

Terminology

The following terms are used in this application in accordance with their plain meanings, which are understood to be known to those of skill in the pertinent art(s). However, for the sake of further clarification in view of the subject matter of this application, the following explanations, elaborations and exemplifications are given as to how these terms may be used or applied herein. It is to be understood that the below explanations, elaborations and exemplifications are to be taken as exemplary or representative and are not to be taken as exclusive or limiting. Rather, the terms discussed below are to be construed as broadly as possible, consistent with their ordinary meanings and the below discussion.

Member—The terms "member" and "member device" and "cluster node" may be used interchangeably. A clustered system includes a plurality of member devices. Each member may serve a function which is parallel to at least one other member, such that the members are functionally interchangeable and function in parallel.

Cluster—A cluster includes plurality of member devices which perform multiple instances of a task in parallel. The cluster may also be referred to as a "cluster network", of a "clustered system".

BRIEF DESCRIPTION OF THE DRAWINGS

Various embodiments of a method and system for predictive synchronization of a clustered system are herein described, by way of example only, with reference to the accompanying drawings, where.

DESCRIPTION OF THE PREFERRED EMBODIMENTS

The principles and operation of a predictive synchronization of a clustered system according to various embodiments may be better understood with reference to the drawings and the accompanying description.

Flow synchronization may be maintained among multiple cluster members in order to allow redundancy. This may be done by synchronizing each session to a backup member (the backup member is the cluster member that will handle a session in place of the "home device" in case of failure of the home device that originally handled a session). In case of dual clustered systems, the session may be synchronized to a backup member which is one of the cluster nodes in a backup cluster. Thus, in case of overall system failure of the home cluster, the backup cluster will maintain the active sessions.

Figure 2:
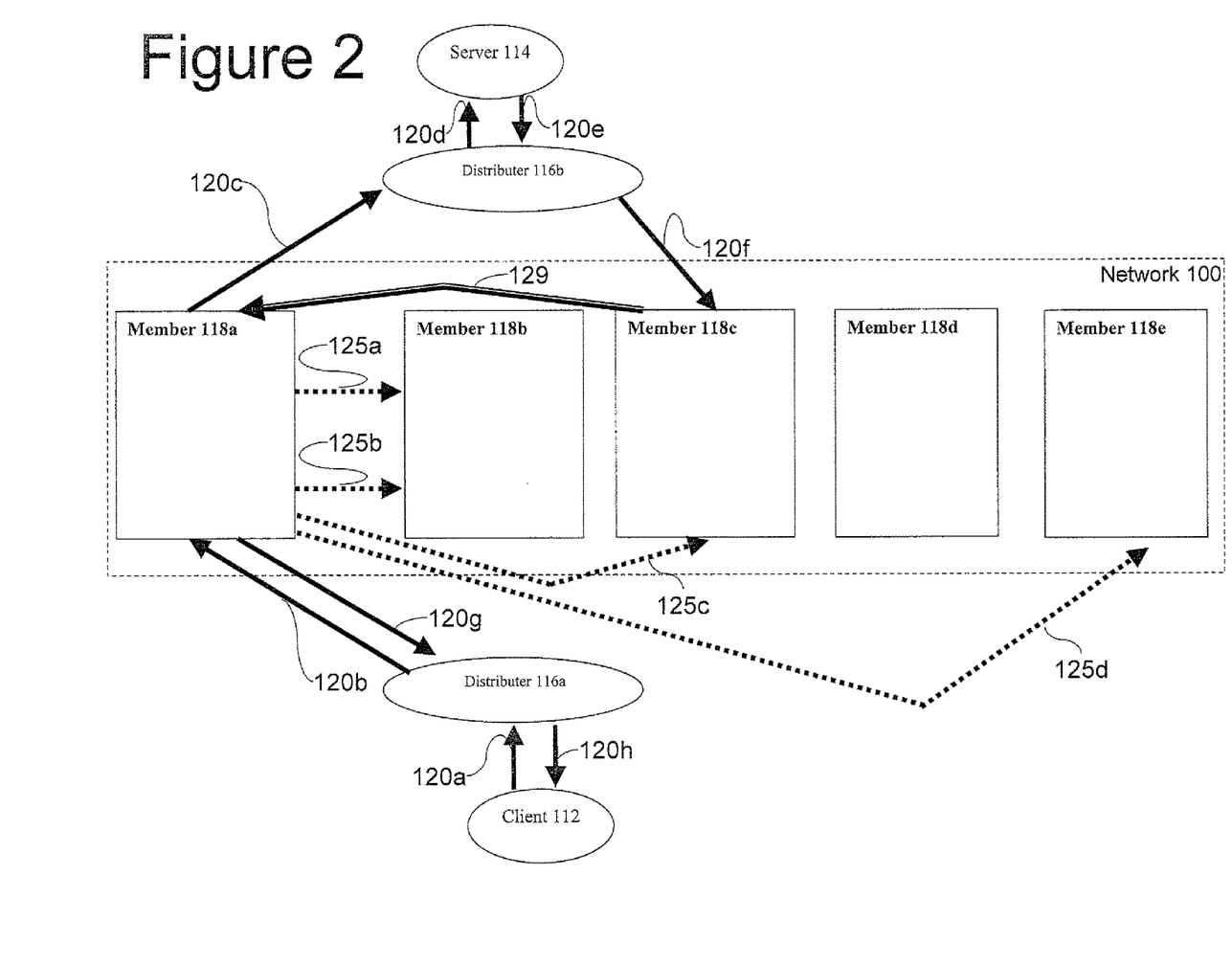
FIG. 2 is a block diagram illustrating an embodiment of a predictively synchronized cluster having a stateless distributor.

Referring now to the drawings, FIG. 2 is a block diagram illustrating an embodiment of a cluster 100 using predictive synchronization. Cluster 100 contains five members: 118a, 118b, 118c, 118d and 118e.

A client 112 on a trusted network starts a session by sending 120a a request packet to open a connection to a server 114 on the Internet. According to a deterministic hash algorithm, a distributor 116a designates member 118a to receive the request packet and sends 120b the packet to member 118a.

Member 118a determines that the packet's connection designators, a.k.a. 5-tuple (src IP, dst IP, protocol, src port, dst port) are not in any of the existing lookup tables and accordingly, the packet does not belong to any existing session. Therefore, member 118a takes ownership of the new session becoming the home member for the session. Member 118a is configured to predict the results of the deterministic hash function used by distributors 116a and 116b to designate a cluster member to receive a packet. Thus, member 118a predicts that if member 118a malfunctions, distributor 116a will designate a backup member, member 118b as an alternative pathway to receive further packets in the new session. Therefore, home member 118a relays 125a state information associated with the request packet, in a unicast manner, to member 118b but not to other members 118c-e. In the example, when the new session is started, state information including IP addresses and port numbers for legitimate request and reply packets are relayed 125a from the home member 118a to the backup member 118b. As further packets are received, updated sequence numbers associated with the session are relayed 125b from the home member 118a to the backup member 118b.

Member 118a determines the legitimacy of the request packet, and modifies the request packet (for example to protect the identity of the trusted host using network address translation NAT or to prevent message interception using VPN encryption) and sends 120c the altered request packet (having altered IP-addresses) through a second distributor 116b which sends 120d the altered request packet to server 114.

Because member 118a is configured to predict the results of the deterministic hash function used by distributors 116a and 116b to designate a cluster member to receive a packet and member 118a knows the altered IP addresses that will be used in the reply packet of the new session, member 118*a* determines that distributor 116*b* will designate member 118*c* to receive the reply packet of the new session. Member 118*a* relays 125*c* instructions associated to the reply packet to member 118*c*. Specifically, member 118*a* relays 125*c* that when a reply packet having the expected header information arrives from server 114, member 118*c* is to bounce the reply packet to member 118*a*. Member 118*c* will further determine (either based on a local predictive algorithm or based on instructions from member 118*a*) that upon failure of member 118*a*, reply packets from the session should be sent to member 118*b* (which contains a backup of the session state information, as stated above). Furthermore, member 118*a* predicts that if member 118*c* malfunctions, then distributor 116*b* will redirect reply packets to a second backup member, member 118*e*. Therefore, member 118*a* relays 125*d* instructions to member 118*e* that if a reply packet from the session arrives at member 118*e*, the reply packet should be bounced to member 118*a* and that if member 118*a* malfunctions, the reply packet should be bounced to member 118*b*. Alternatively, member 118*c* could predict the identity of backup member 118*e* locally and relay instructions to member 118*e*

Server 114 sends 120*e* a reply packet to distributor 116*b*. Based on the deterministic hash function and the altered IP addresses of the reply packet, distributor 116*b* sends 120*f* the reply packet to member 118*c* (as predicted by member 118*a*). According to instructions from member 118*a*, the reply packet is bounced 129 by member 118*c* to member 118*a*.

Member 118*a* handled the original request packet and has all of the state information necessary to handle the reply packet. Member 118*a* verifies the reply packet and sends 120*g* the reply packet to distributor 116*a* which sends 120*h* the reply packet to client 112. Member 118*a* further relays 125*b* updated state information of the reply flow (for example updated sequence numbers) to backup member 118*b*. Whether and when update information is relayed to backup member 118*b* depends on the flow type (e.g. TCP/UDP) and the security that is applied on the flow.

Thus, the session is synchronized only to one backup member (118*b*) that will actually take place of member 118*a* and handle the session in case of failure of member 118*a*. In case of dual clustered systems, the session will be synchronized to a backup member, which is one of the cluster members of the backup cluster. Thus, in case of overall chassis failure, the backup chassis (included the backup cluster) will maintain active sessions.

It will be understood that the above embodiment may achieve almost linear scalability in session capacity and significantly improve the performance scalability of the overall clustered system using simple distributors 116*a-b*.

Figure 3:
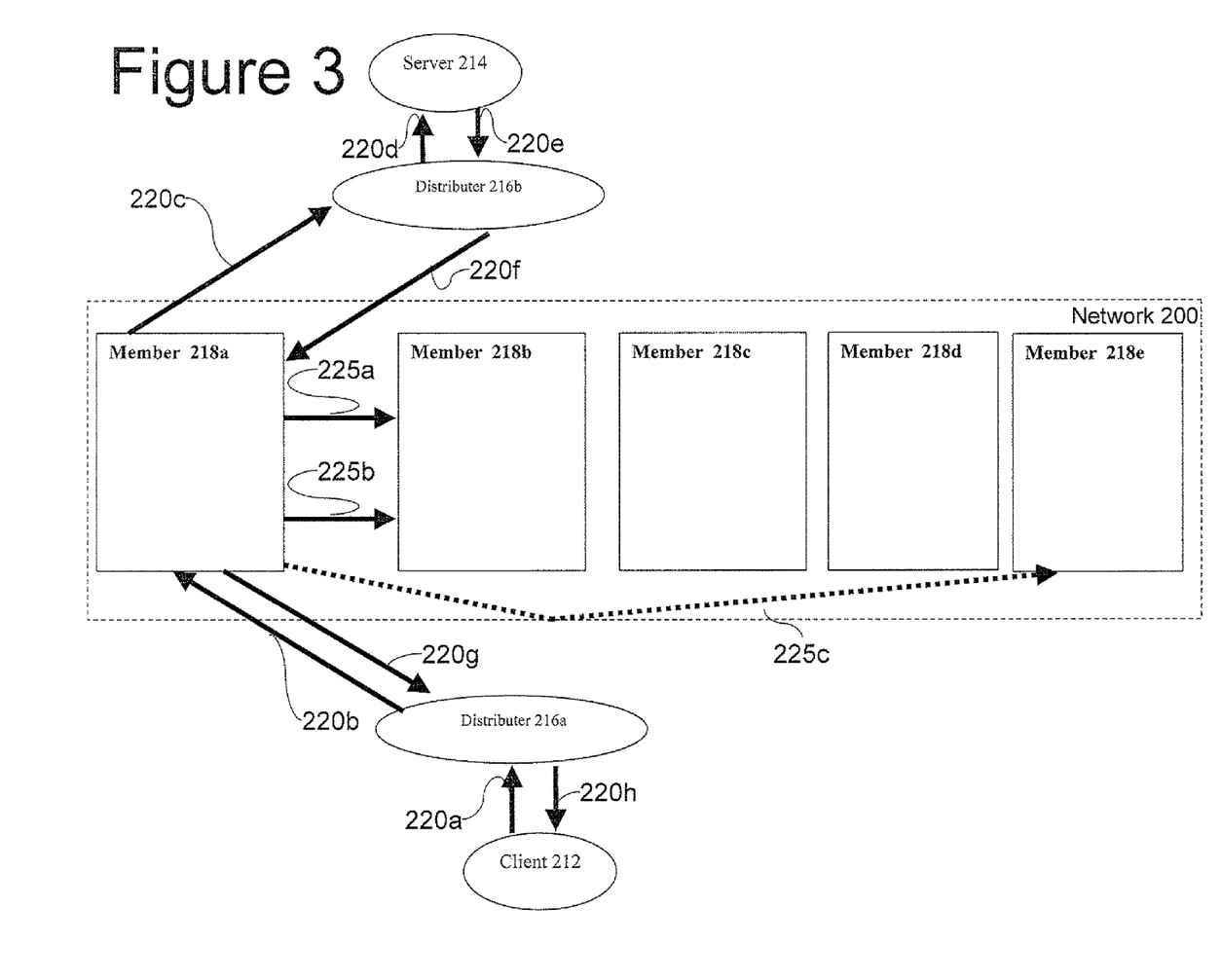
FIG. 3 is an illustration of an example of an predictively synchronized embodiment of a cluster having a stateful distributor.

FIG. 3 illustrates an embodiment of a predictively synchronized cluster system employing stateful distributors 216*a* and 216*b*. Distributors 216*a,b* store state information for each session. For example, a stateful distributer may remember on which cluster member the flow was originated. The stateful distributer may then maintain the particular flow through the particular member. Particularly, distributors 216*a*, b associate request and reply packets and send all packets pertaining to a particular session to the same member of a cluster 200. Cluster 200 contains five members: 218*a*, 218*b*, 218*c*, 218*d* and 218*e*. A client 212 on a trusted network sends 220*a* a request packet to open a connection to a server 214 on the Internet. According to a deterministic hash algorithm, a distributor 216*a* designates a first member 218*a* of cluster 200 to receive the request packet and sends 220*b* the packet to member 218*a*.

Member 218*a* is configured to predict the results of the deterministic hash function used by distributors 216*a* and 216*b*. Thus, member 218*a* predicts that if member 218*a* malfunctions, further packets will be sent through a backup member, member 218*b*. Therefore, member 218*a* relays 225*a* in a unicast manner state information of the request packet to member 218*b* only.

Member 218*a* determines the legitimacy of the request packet, modifies the request packet (using VPN encryption or NAT) and sends 220*c* the altered request packet (having altered IP-addresses) through a second distributor 216*b* which records the IP address of the altered request packet and sends 220*d* the altered request packet to server 214. Member 218*a* also predicts that if member 218*a* were to malfunction, distributor 216*b* would redirect the session (based on a deterministic hash function and the IP address) by designating member 218*e* as a backup member to receive further reply packets from the session. Therefore, member 218*a* relays 225*c* instructions to member 218*e* that in case of malfunction of member 218*a*, any redirected reply packets from the session should be sent to backup member 218*b*.

Distributor 216*b* sends 220*d* the altered request packet to server 214. Server 214 sends 220*e* a reply packet to distributor 116*b*. Based on stored state information, distributor 116*b* sends 220*f* the reply packet to member 218*a*

Member 218*a* handled the original request packet and has all information necessary to handle the reply packet. Member 218*a* verifies the reply packet and sends 220*g* the reply packet to distributor 216*a* which sends 220*h* the reply packet to client 212. Member 218*a* further relays 225*b* updated state information of the reply flow to the backup member, member 218*b*.

Thus, the session is synchronized only to one cluster member (218*b*) that serves as a backup member and will actually take place of member 218*a* and handle the session in case of failure of member 218*a*. In the case of dual clustered systems, backup member will belong to the backup clustered system. Thus, in case of overall chassis failure, the backup chassis will maintain the active sessions.

Figure 4:
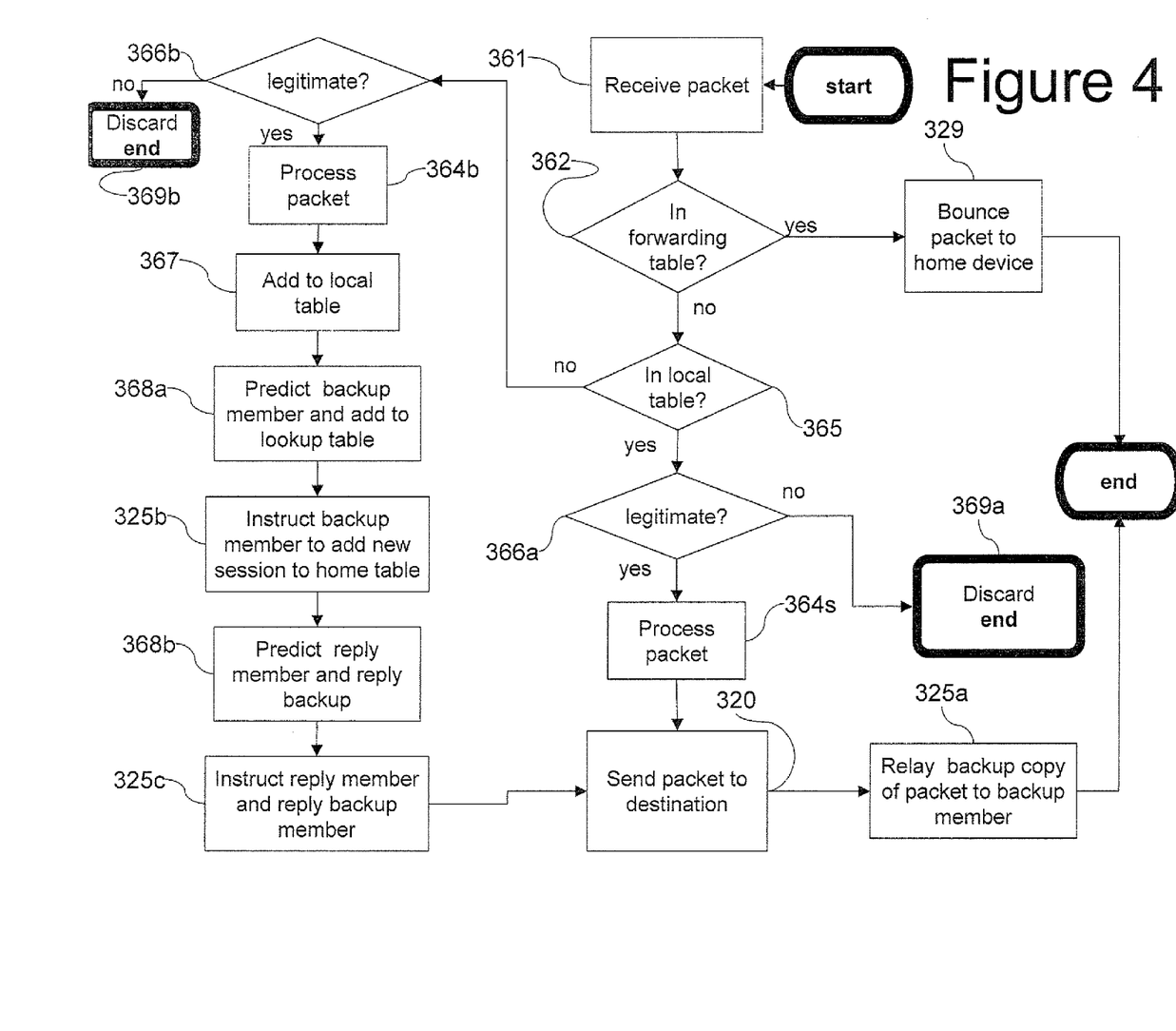
FIG. 4 is a flowchart of a method of distributing data packets over a predictively synchronized cluster.

FIG. 4 is a flowchart showing a method of handling of a packet by a member of a cluster system based on the example in FIG. 2. When member 118*a* receives 361 a packet, member 118*a* checks 362 a cluster forwarding table. If the packet address is in the cluster forwarding table, then the packet is bounced 329 to the owner member, as specified in the cluster forwarding table. If the packet address is not in the cluster forwarding table, then the packet is from a session that is locally owned by the member 118*a* (member 118*a* is the home member for the session). Member 118*a* then checks 365 if the packet header information is already in the local ownership table. If the packet header information is already in the local ownership table, then the packet belongs to an existing session. Therefore member 118*a* checks 366*a* whether the packet is a legitimate continuation of the session. If not (for example if the packet transgresses a security requirement of the firewall and in a more specific example if the packet sequence number is not the proper continuation from a previous packet in the session) then the packet is discarded 369*a*. If the packet is legitimate, then member 118*a* processes 364*a* the packet (for example, adding security coding, encrypting the packet, or modifying the packet header). Because the packet is from an already existing session owned by member 118*a*, the local ownership table also includes the cluster address of the backup member (in this case, member 118*b*). Cluster member 118*a* sends 320 the packet to its destination and relays 325*a* state information of the packet to backup member 118*b*.

Alternatively, the local ownership table may not include the identification of backup member 118*b*. Instead, the identity of backup member 118*b* may be predicted using an algorithm, as is done for a packet from a new session (as explained below) or there may be a separate lookup table of backup members.

If the packet is in neither the cluster forwarding table nor the local session table, this means that the packet is a request packet to start a new session. Therefore, member 118a checks 366b if the packet is a legitimate request packet for starting a new session. If the packet is not legitimate (for example, a packet that transgresses a security protocol of the firewall and in a more specifically example a packet from an Internet server that is not a response to a request sent to that server by a user on a trusted network), then it is discarded 369b. If the packet is legitimate, then member 118a processes 364b the packet (for example, adding security coding, encrypting the packet, or modifying the packet header) and takes local ownership of the new session by adding session information to the local ownership table of member 118a. In the example in FIG. 4, taking ownership is accomplished by adding 367 the header information for both outgoing and reply flows to the local session lookup table. Member 118a predicts 368a that member 118b will be used for backup flows in case member 118a fails. In order to make this prediction, member 118a uses the same algorithm employed by the distributors 116a-b to designate which cluster member will receive a packet. Therefore, member 118a adds the cluster address of backup member 118b to the entry of the new session in the local session lookup table. Member 118a also relays 325b instructions to member 118b to add the new session to the local session lookup table of member 118b and that in the local session lookup table of member 118b, the backup member associated with the new session will be member 118a. Thus, if member 118a fails and a packet from the new session is sent to member 118b, then member 118b will immediately accept the session, becoming the owner of the session and continuing the flow. If member 118a returns to functionality, it will have been updated with all the session information and will be able to continue to handle the session. Alternatively, member 118a may not instruct member 118b to add the new session to its local session table. Then, if member 118a were to fail, and a packet from the session were to be sent to member 118b, then member 118b would treat the session as a new session and update all pertinent lookup tables (in a manner similar to the description of adding 367 header information to the lookup table of member 118a for a new session, as described above).

Using the same algorithm employed by distributors 116a-b to designate cluster members to receive a packet and based on the modified (e.g., NAT) IP addresses computed during packet processing 364b, member 118a predicts 368b that reply packets for the new session will be sent by distributor 116b to member 118c, and if member 118c fails, reply packets for the new session will be sent to member 118e. Therefore, member 118a relays 325c instructions to members 118c and 118e to add the header information of the reply flow of the new session to their cluster forwarding tables so that if member 118c or 118e receives a reply packets from the new session, it will bounce the reply packet to member 118a and if member 118a fails, then member 118c or 118e will bounce reply packets of the new session to backup member 118b.

After updating all of the pertinent state tables (the local session table of members 118a-b and the cluster forwarding tables of members 118b and 118e) for the new session, member 118a sends 320 the packet to its destination and relays 325a updated state information to backup member 118b.

Figure 5:
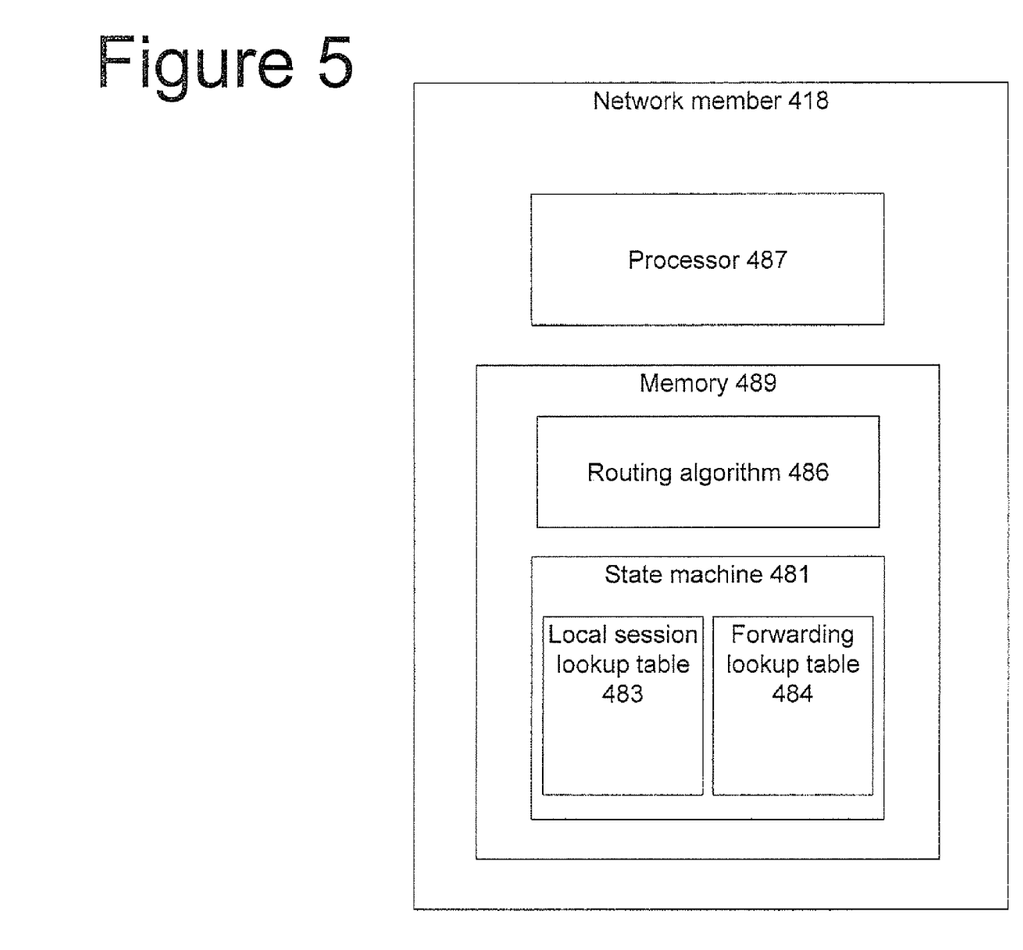
FIG. 5 is a block illustration of a member of a predictively synchronized cluster network.

FIG. 5 shows a block diagram of member 418 of a clustered system. In the example in FIG. 5, member 418 is a firewall device. Member 418 includes a processor 487 for executing commands stored in memory 489 in the example illustrated in FIG. 5, memory 489 and processor 487 are physically part of member 418. Alternatively a memory may be external to the member, but accessible by the member. In the embodiment shown, processor 487 accesses a state machine 481 stored in memory 489 of member 418 that is used to process packets. State machine 481 includes software or data structure stored in memory 489 that stores a state of member 418. For example, the method in FIG. 4 performs functions based on the state stored in state machine 481. State machine 481 includes lookup tables that store state information for processing firewall transactions. In the example in FIG. 5 (illustrating an embodiment of a member 418 capable of performing the method in FIG. 4), memory 489 includes a local session state lookup table 483 containing a list of old sessions of which member 418 has already taken ownership and a cluster forwarding lookup table 484.

An entry in the lookup tables may include session identification information such as a protocol identifier that indicates the type of protocol used for the transaction (e.g., TCP, UDP), a source IP address for the source of the data packet, a source port, a destination IP address, and a destination port. Each entry may also store other information, such as forwarding information and relay information indicating the internal cluster member of the packet. Corresponding information for the session may be contained in each data packet passing through the clustered system.

For each included session, local session lookup table 483 includes the IP addresses of request and reply flows for the session and the identity of the backup member of the session. For example, in an embodiment of the clustered system in FIG. 2, performing the method of FIG. 4, the local session lookup table of member 118a would include the IP address of the request and reply packets of the illustrated session. The local session lookup table would also contain information associated with those IP addresses, identifying member 118b as the backup member and members 118c and 118e as the reply member and reply backup member, respectively. Local session lookup table 483 may also include other information, for example the current state of a sequence number.

Cluster forwarding lookup table 484 includes an entry for each session for which another member instructed member 418 to bounce packets to the home member of that session. For example, in an embodiment of the clustered system in FIG. 2 performing the method of FIG. 4, the forwarding table of member 118c includes the reply IP addresses of the illustrated session and identifies member 118a as the home member and member 118b as the backup member of that session.

State machine 481 may include a method embodied in executable software instructions for determining how to process data packets. Member 418 may be in various states at different instances.

For example, member 418 may receive directly from a distributor a packet from a session for which member 418 is already the home member (in the embodiment of FIG. 5, the IP address of such a packet will be in local session lookup table 483).

Member 418 may also receive from a distributor packets belonging to a session owned by another cluster member. For example, in the embodiment of FIG. 2, cluster member 118c receives response packets of a session belonging to cluster member 118a. In the embodiment of FIG. 5, before cluster member 418 receives a packet from a session belonging to another cluster member, the other cluster member will have already predicted that the distributor will designate member 418 to receive the packet and will already have instructed cluster member 418 to bounce the packet to the other cluster member. Particularly, in the example of FIG. 2, member 118*a* already predicted that distributor 116*b* will designate member 118*c* to receive a reply packet and informed member 118c to add the reply IP address and the identity of cluster member 118*a* to the cluster forwarding table of member 118*c* before the reply packet arrives. Cluster forwarding lookup table 484 has forwarding information used to bounce packets from member 418 to the home device of the session. In one example, cluster forwarding lookup table 484 includes separate entries for separate sessions. The forwarding information may include the same information as local session lookup table 483, such as the protocol identifier, the source IP address, the source port, the destination IP address, and the destination port, to identify a session. For each entry, the forwarding information may also include the home member cluster address. This information enables member 418 to associate a session with a home cluster member. Alternatively, the local session information or the forwarding information may also be embodied in other data structures.

Cluster member 418 may also receive an unrecognized packet (defined as a packet that has an IP address not found in any lookup table of cluster member 418). In the embodiment of FIG. 5, arrival of an unrecognized packet implies that member 418 should start a new session for the unrecognized packet, as explained starting in step 366*b* in FIG. 4.

Memory 489 also contains a forwarding algorithm 486 to predict which cluster member will be designated to receive a packet associated with a session. For example, in the embodiment of FIG. 2, member 118*a* includes the algorithm used by distributors 116*a-b* to designate a cluster member to receive a packet associated with the new session belonging to member 118*a* (packets associated with a session may include a request packet or a reply packet that is part of the session, or they may include a backup packet sent to a backup member when the home member fails), Member 418 uses forwarding algorithm 486 to predict which member of the cluster will be designated to receive a packet associated with a session. For example, in the embodiment of FIG. 2, member 118*a* uses forwarding algorithm 486 to predict that distributor 116*b* will designate member 118*c* to receive a reply packet of the new session belonging to member 118*a*. Alternatively, if designation of members of a cluster to receive packets were to be made using more than one algorithm, then member 418 would include multiple algorithms to predict designation of cluster members.

In summary, although various example embodiments have been described in considerable detail, variations and modifications thereof and other embodiments are possible. Therefore, the spirit and scope of the appended claims is not limited to the description of the embodiments contained herein.

What is claimed is:

1. A computer-readable storage media comprising computer-executable instructions stored thereon, the computer-executable instructions, when executed, configuring a clustered system to perform actions comprising:
   a) relaying of information associated with a packet from a first member of the clustered system to a second member of the clustered system before arrival of said packet directly to said second member from outside the clustered system,
   b) predicting designation of said second member to receive said packet directly from outside the clustered system, and
   c) bouncing said packet from said second member to said first member.

2. The computer-readable storage media of claim 1, wherein said predicting includes computing a deterministic function.

3. The computer-readable storage media of claim 1, wherein said predicting includes computing a hashing function.

4. The computer-readable storage media of claim 1, wherein said relaying is unicast.

5. The computer-readable storage media of claim 1, wherein the computer-executable instructions when executed configure the clustered system to perform said relaying subsequent to said predicting.

6. The computer-readable storage media of claim 1, wherein the actions further comprise: c) discarding of an illegitimate packet by the first member.

7. A clustered system including a plurality of members, comprising:
   a) a memory accessible to a first member of the plurality of members, said memory configured to store
      i) a state machine and
      ii) an algorithm for predicting designation of a second member of the plurality of members to receive a packet directly from outside the clustered system, and
   b) a processor accessible to said first member, said processor configured to execute said algorithm;
wherein said information includes instructions for said second member to bounce said packet to said first member.

8. The clustered system of claim 7, wherein said processor is further configured for relaying information associated with said packet to said second member.

9. The clustered system of claim 7, wherein said processor is further configured to not relay said information to a third member of said plurality of members.

10. The clustered system of claim 7, wherein said processor is further configured to relay said information by unicast communication.

11. The clustered system of claim 7, wherein said processor is further configured to discard an illegitimate packet.

12. A method of synchronizing a clustered system having at least a first member and a second member, the method comprising:
   a) relaying from the first member to the second member information associated with a packet before arrival of said packet directly to the second member from outside the clustered system, and
   b) predicting designation of the second member to receive said packet directly from outside the clustered system;
wherein said second member is a backup member.

13. A method of synchronizing a clustered system having at least a first member and a second member, the method comprising:
   a) relaying from the first member to the second member information associated with a packet before arrival of said packet directly to the second member from outside the clustered system,
   b) predicting designation of the second member to receive said packet directly from outside the clustered system, and
   c) bouncing said packet from the second member to the first member.

14. A method of synchronizing a clustered system having at least a first member and a second member, the method comprising:
   a) relaying from the first member to the second member information associated with a packet before arrival of said packet directly to the second member from outside the clustered system, and b) predicting designation of the second member to receive said packet directly from outside the clustered system, wherein said relaying is not to a third member of the clustered system.

15. A computer-readable storage media comprising computer-executable instructions stored thereon, the computer-executable instructions, when executed, configuring a clustered system to perform actions comprising:
- a) relaying of information associated with a packet from a first member of the clustered system to a second member of the clustered system before arrival of said packet directly to said second member from outside the clustered system, and
- b) predicting designation of said second member to receive said packet directly from outside the clustered system;

wherein said relaying is not to a third member of the clustered system.

16. A clustered system including a plurality of members, comprising:
- a) a memory accessible to a first member of the plurality of members, said memory configured to store
  - i) a state machine and
  - ii) an algorithm for predicting designation of a second member of the plurality of members to receive a packet directly from outside the clustered system, and
- b) a processor accessible to said first member, said processor configured to execute said algorithm;

wherein said second member is a backup member.

17. A method of synchronizing a clustered system having at least a first member and a second member, the method comprising:
- a) relaying from the first member to the second member information associated with a reply packet before arrival of said packet directly to the second member from outside the clustered system, and
- b) predicting designation of the second member to receive said packet directly from outside the clustered system.

18. A computer-readable storage media comprising computer-executable instructions stored thereon, the computer-executable instructions, when executed, configuring a clustered system to perform actions comprising:
- a) relaying of information associated with a packet from a first member of the clustered system to a second member of the clustered system before arrival of said packet directly to said second member from outside the clustered system; and
- b) predicting designation of said second member to receive said packet directly from outside the clustered system.

19. A clustered system including a plurality of members, comprising:
- a) a memory accessible to a first member of the plurality of members, said memory configured to store
  - i) a state machine and
  - ii) an algorithm for predicting designation of a second member of the plurality of members to receive a packet directly from outside the clustered system, and
- b) a processor accessible to said first member, said processor configured to execute said algorithm.

* * * * *